United States Patent [19]

Sugihara

[11] Patent Number: 4,500,049
[45] Date of Patent: Feb. 19, 1985

[54] DEVICE FOR AUTOMATICALLY STOPPING A TAPE RECORDER

[75] Inventor: Masanori Sugihara, Saitama, Japan

[73] Assignee: Pioneer Electronic Corporation, Tokyo, Japan

[21] Appl. No.: 413,842

[22] Filed: Sep. 1, 1982

[30] Foreign Application Priority Data

Sep. 2, 1981 [JP] Japan .................. 56-130478[U]
Sep. 2, 1981 [JP] Japan .................. 56-130479[U]

[51] Int. Cl.³ .............. B65H 59/38; G03B 1/04; G11B 15/32
[52] U.S. Cl. ................... 242/186; 242/191; 360/74.2
[58] Field of Search ............ 242/186, 189, 190, 191; 200/61.13–61.16; 360/74.1, 74.2, 74.3, 74.5, 75, 105, 137

[56] References Cited

U.S. PATENT DOCUMENTS 3,653,607  4/1972  Lambeek et al. ............... 242/191
3,677,493  7/1972  Staar ............................ 242/191
4,089,487  5/1978  Ichikawa et al. ............... 242/186

FOREIGN PATENT DOCUMENTS 207726  3/1957  Australia ..................... 360/74.2

Primary Examiner—Leonard D. Christian
Attorney, Agent, or Firm—Sughrue, Mion, Zinn, Macpeak & Seas

[57] ABSTRACT

A malfunction prevention device for a tape recorder functions to place the recorder in a stop mode upon an erroneous manual operation such as the actuation of rewind and fast forward controls at the same time. The device operates in conjunction with a device stopping the recorder when the end of the tape is reached.

7 Claims, 3 Drawing Figures

DEVICE FOR AUTOMATICALLY STOPPING A TAPE RECORDER

BACKGROUND OF THE INVENTION

The present invention relates to a device for automatically stopping a tape recorder, and more particularly to a device for automatically stopping a tape recorder when the tape is completely wound up. Also, the present invention relates to a malfunction prevention device for a tape recorder, and more particularly to a malfunction prevention device for protecting the tape recorder against failure when the tape recorder is erroneously controlled to enter both the rewinding and the fast-forward modes at the same time.

Various devices for automatically stopping tape recorders are known. One type of automatic stopper includes means for detecting a special tape at the tape end. Another automatic stopper detects the back tension imposed on the tape in automatically stopping the tape recorder.

More changeover in some tape recorders is effected by a power-driven plunger. In such an arrangement, there is a need for guarding against any tape recorder failure when the tape recorder is controlled to enter both the fast-forward and rewinding modes of operation at the same time.

SUMMARY OF THE INVENTION

It is thus an object of the present invention to prevent a tape recorder mechanism from being damaged when erroneously controlled. According to the present invention, when a tape recorder is controlled by an erroneous operation, a plunger switch for bringing the tape recorder into a stop mode is actuated to stop the tape recorder.

It is a further object of the present invention to provide an automatic tape recorder stopping device which will operate reliably and free of malfunctions. According to the present invention, the movement of a sensing arm frictionally coupled to a takeup reel pulley is detected for automatically stopping the tape winding operation simultaneously with the completion of tape winding.

BRIEF DESCRIPTION OF THE DRAWINGS

The present invention will now be described with reference to the accompanying drawings, in which.

DETAILED DESCRIPTION OF THE EMBODIMENT

Figure 1:
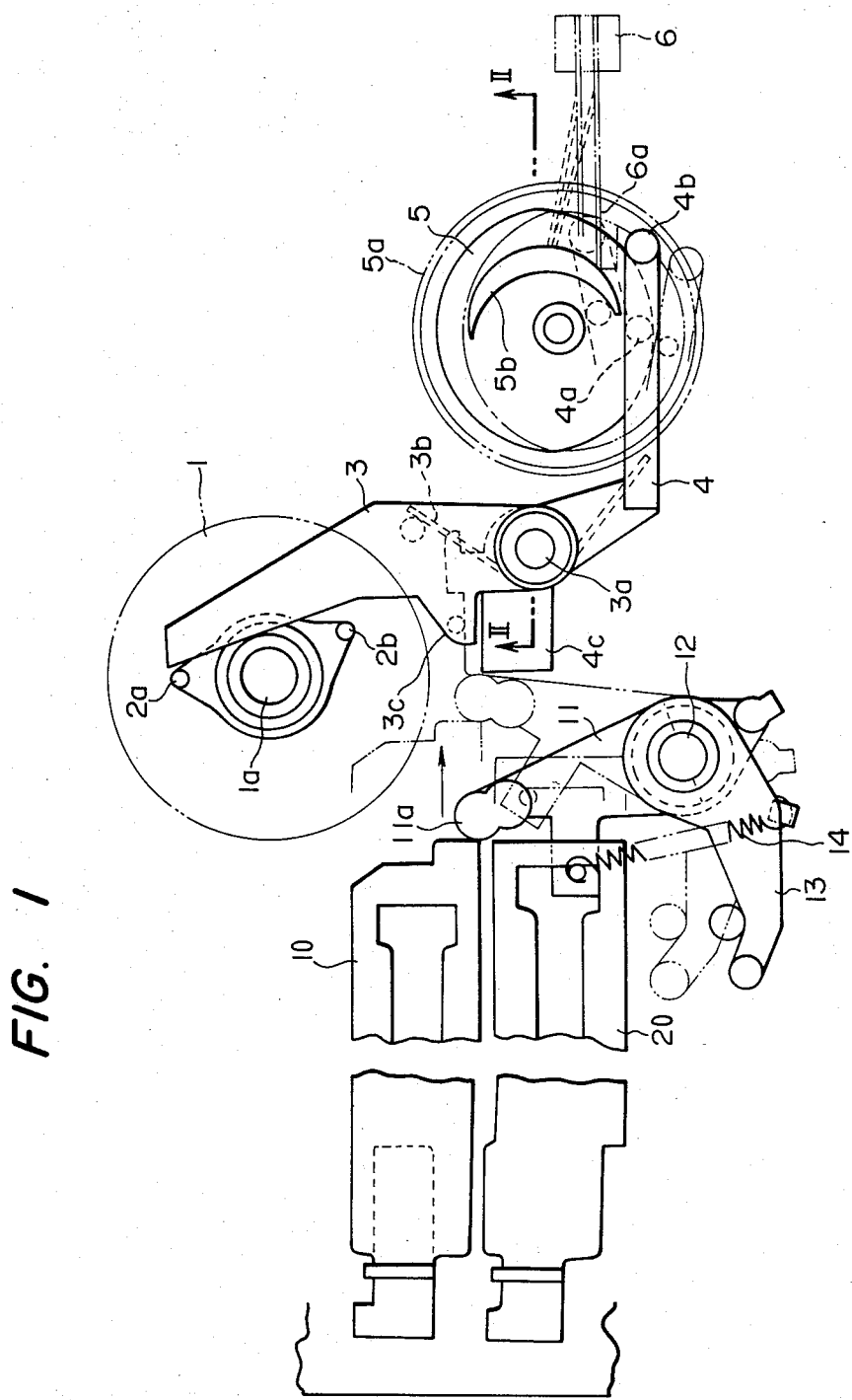
FIG. 1 is a plan view of a mulfunction prevention device for automatically stopping a tape recorder.
Figure 2:
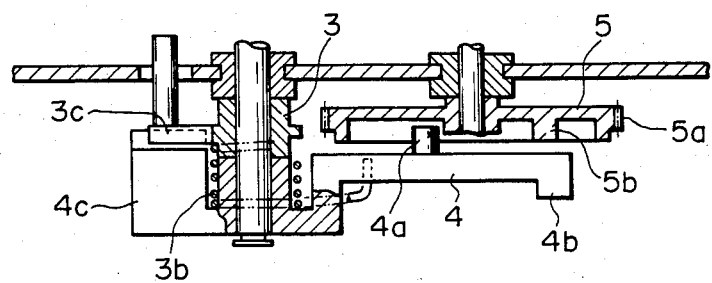
FIG. 2 is a cross-sectional view taken along line II—II of FIG. 1.
Figure 3:
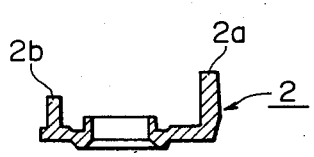
FIG. 3 is a cross-sectional view of a sensing arm.

As shown in FIG. 1, a takeup reel pulley 1 includes a shaft 1a on which there is mounted a sensing arm 2 coupled through friction to the takeup reel pulley 1. The sensing arm 2 has a pair of upward projections 2a, 2b for abutting engagement with a stop lever 3. The stop lever 3 is pivotally mounted on a chassis by a pivot shaft 3a and is urged by a torsion spring 3b toward the sensing arm 2. A stop arm 4 extends from the pivot shaft 3a and is resiliently coupled to the stop lever 3 by the torsion spring 3b. Under no or light load, the stop lever 3 and the stop arm 4 are rotatable in unison about the pivot shaft 3a.

The stop arm 4 has a pin 4a on its upper surface and a switch actuator projection 4b on its lower surface at a distal end thereof.

A rotating can 5 is positioned adjacent to the stop arm 4 and rotates while the tape recorder is in use or is being rotated in any mode, the rotating cam 5 having around its circumference teeth 5a for receiving torque. The rotating cam 5 has on its lower surface a crescent-shaped engaging cam 5b extending along a substantially semicircular arc in eccentric relation to the axis of rotation of the rotating cam 5, the engaging cam 5b being engageable with the pin 4a.

When the engaging cam 5b engages the pin 4a, the stop arm 4 is rotated against the resiliency of the torsion spring 3b to cause the switch actuator projection 4b to push a contact 6a of a plunger switch 6 to energize a stop mode plunger.

The device thus constructed according to the present invention will operate as follows: When the sensing arm 2 frictionally coupled to the takeup reel pulley becomes sluggish in motion, the stop lever 3 is no longer pushed, and the stop lever 3 and the stop arm 4 are angularly moved slightly counterclockwise in FIG. 1 to allow the pin 4a to be engaged by the crescent-shaped engaging cam 5b, whereupon the stop arm 4 is turned against the resiliency of the torsion spring 3b. Rotation of the rotating cam 5 causes the stop arm 4 to bend with the switch actuator button 4b closing the contact 6a of the plunger switch 6 to thereby bring the tape recorder into the stop mode.

As shown in FIG. 1, the malfunction prevention device according to the present invention includes a fast-forward mode control lever 10 and a rewinding mode control lever 20. A fast-forward mode control arm 11 for actuating a fast-forward tape feed mechanism is pivotably mounted on a chassis adjacent a distal end of the fast-forward mode control lever 10 within the stroke range thereof. The fast-forward control arm 11 has on its distal end a presser 11a against which the distal end of the fast-forward mode control lever 10 is held. The fast-forward control arm 11 is pivotable about a pivot shaft 12, from which extends a head base pusher arm 13 urged by a tension spring 14 toward the fast-forward control arm 11, and is angularly movable about the pivot shaft 12 in response to a stroke of the fast-forward mode control lever 10. With the fast-forward control arm 11 thus angularly moved, the rewinding mode control lever 20 when pushed a full stroke thereof will be brought into abutment against the fast-forward control arm 11 as will be described later.

The stop lever 3 is pivotably mounted on the chassis by the pivot shaft 3a at a position normally ahead of the fast-forward control arm 11 when pushed its full stroke, the stop lever 3 being urged by the torsion spring 3b to rotate counterclockwise in FIG. 1. As noted previously, the stop arm 4 extends from the pivot shaft 3a and is resiliently coupled to the stop lever 3 by the torsion spring 3b such that under no or light load, the stop lever 3 and the stop arm 4 are rotatable in unison about the pivot shaft 3a.

The fast-forward control arm 11 is located within the stroke of movement of the rewinding mode control lever 20 and can be angularly moved in response to movement of the rewinding mode control lever 20. Stated otherwise, the fast-forward control arm 11 is pushed in the rewinding mode as the latter is a mode in which the tape is wound back at a fast rate.

When the fast-forward control arm 11 is abnormally actuated simultaneously by both the fast-forward mode control lever 10 and the rewinding mode control lever 2, rotative power is transmitted to a fast-forward pulley to incline the stop lever 3 slightly counterclockwise into abutment against the fast-forward control arm 11, and the stop arm 4 is slightly raised in FIG. 1.

At this time, the engaging cam 5b of the rotating cam 5 engages the pin 4a on the stop arm 4 and displaces the pin 5a in the direction of rotation of the rotating cam 5 to cause the switch actuator projection 4b to press the contact of the plunger switch 6 to thereby energize the stop mode-plunger. The tape recorder now enters the stop mode.

With the device for automatically stopping the tape recorder as described above, the stop arm is angularly moved through the stop lever in response to the movement of the sensing arm frictionally coupled to the takeup reel pulley, whereby the tape recorder enters a stop mode. Accordingly, the rewinding operation of the tape can reliably be stopped automatically in response to movement of the takeup reel pulley.

Also, with the malfunction prevention device according to the present invention, the switch for the stop mode plunger is closed when the fast-forward mode control lever and the rewinding mode control lever are erroneously simultaneously depressed. Accordingly, the tape recorder is reliably prevented from malfunctioning, and hence failures such as mechanical damage and tape breakage will not be caused.

What is claimed is:

1. A device for automatically stopping a tape recorder, comprising; a takeup reel pulley, a sensing arm attached to said takeup reel pulley, a pivot shaft, a stop lever urged against said sensing arm and angularly movable about said pivot shaft, a stop arm extending from said pivot shaft, means for resiliently coupling said stop arm to said stop lever, said stop arm including a switch actuator projection, switch means for enabling said tape recorder to enter a stop mode when said switch means is actuated, and means for urging said projection into contact with said switch means in response to stoppage of said takeup reel pulley to thereby actuate said switch means.

2. A malfunction prevention device for a tape recorder, comprising; a chassis, at least a fast-forward mode control lever and a rewinding mode control lever movably mounted on said chassis, a fast-forward control arm pivotably mounted on said chassis and movable in coaction with said control levers, a stop lever pivotably mounted on the chassis and actuatable in response to an abnormal angular movement of said fast-forward control arm due to simultaneous operation of said control levers, and means operable in response to angular movement of said stop lever to bring the tape recorder into a stop mode, whereby the tape recorder is prevented from malfunctioning due to erroneous simultaneous operation of said control levers.

3. A device as claimed in claim 2, wherein said last mentioned means comprises, a stop arm having a projection at one end thereof, means for resiliently coupling said stop arm to said stop lever, pivotal movement of said stop lever normally translating into pivotal movement of said stop arm, switch means operable when actuated to bring the tape recorder to a stop mode and means for urging said projection into actuating contact with said switch means.

4. A device as claimed in claims 1 or 3, wherein said means for resiliently coupling comprises a torsion spring coupling said stop lever and said stop arm.

5. A device as claimed in claims 1 or 3, wherein said means for urging comprises rotating cam means engageable with said projection to pivot said stop arm such that said projection contacts and switch means.

6. A device as claimed in claim 5, said stop lever being pivoted in response to stoppage of said takeup reel pulley, said pivoting being transmitted to said stop arm, whereby said projection is moved into contact with said cam means.

7. A device as claimed in claim 6, said cam means including a groove, said projection being introducable into said groove in response to pivotal movement of said stop arm resulting from pivoting of said stop lever, whereby said projection is urged into contact with said switch means.

* * * * *